United States Patent
Dawson et al.

(10) Patent No.: US 8,339,974 B1
(45) Date of Patent: Dec. 25, 2012

(54) METHOD AND SYSTEM FOR DETECTING AND MITIGATING RTP-BASED DENIAL OF SERVICE ATTACKS

(75) Inventors: Travis Dawson, San Mateo, CA (US); Mark Evans, San Mateo, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1400 days.

(21) Appl. No.: 11/159,013

(22) Filed: Jun. 22, 2005

(51) Int. Cl.
- *G01R 31/08* (2006.01)
- *G06F 11/00* (2006.01)
- *H04L 12/28* (2006.01)

(52) U.S. Cl. ............... 370/252; 370/235; 370/255

(58) Field of Classification Search .......... 709/215, 709/250, 246; 723/23; 370/233, 252, 392, 370/401, 408, 255, 235
See application file for complete search history.

(56) References Cited

U.S. PATENT DOCUMENTS

| | | | |
|---|---|---|---|
| 6,370,648 B1* | 4/2002 | Diep | 726/22 |
| 6,741,569 B1* | 5/2004 | Clark | 370/252 |
| 6,993,458 B1* | 1/2006 | Castelli et al. | 702/186 |
| 7,028,335 B1* | 4/2006 | Borella et al. | 726/11 |
| 7,032,031 B2* | 4/2006 | Jungck et al. | 709/246 |
| 7,234,168 B2* | 6/2007 | Gupta et al. | 726/25 |
| 7,376,080 B1* | 5/2008 | Riddle et al. | 370/229 |
| 7,376,090 B2* | 5/2008 | Horng et al. | 370/255 |
| 2004/0162992 A1* | 8/2004 | Sami et al. | 713/200 |
| 2005/0007958 A1* | 1/2005 | Auerbach | 370/241 |
| 2005/0044406 A1* | 2/2005 | Stute | 713/201 |
| 2005/0141493 A1* | 6/2005 | Hardy et al. | 370/356 |
| 2005/0265349 A1* | 12/2005 | Garg et al. | 370/395.2 |
| 2006/0272018 A1* | 11/2006 | Fouant | 726/23 |

\* cited by examiner

*Primary Examiner* — Mark Rinehart
*Assistant Examiner* — Angel Brockman

(57) ABSTRACT

This present invention provides a method and system for detecting and mitigating RTP-based denial of service attacks. A prediction model is implemented to analyze data within RTP packets to predict a range of valid data for future packets. Subsequent RTP packets that contain data that fall within the predicted range of data are considered valid RTP packets while others may be considered invalid packets subject to additional analysis.

29 Claims, 6 Drawing Sheets

$$\hat{\gamma} = \alpha + \beta\chi + \varepsilon$$

METHOD AND SYSTEM FOR DETECTING AND MITIGATING RTP-BASED DENIAL OF SERVICE ATTACKS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of telecommunications, computer software, and packet networks. It includes telephone handsets, test equipment, computer hardware, and network performance parameters.

BACKGROUND OF THE INVENTION

Voice over packet (VOP) is a process of sending voice or video signals over the Internet or other communications networks, such as intranets. If the telephone signal is in analog form (voice or fax), the signal is first converted to a digital form. Packet-routing information is then added to the digital voice signal so the voice signal can be routed through the Internet or other data networks.

Realtime Transport Protocol (RTP) is a protocol implemented to carry content in a packet network. The content may be audio, video, or other media in packet form. RTP packets move across the packet network in data streams from one endpoint to another. These RTP streams contain timestamp and sequence number fields in each RTP packet. Each RTP packet may be uniquely identified by a timestamp and sequence number. As an RTP stream progress, the timestamp and sequence number fields in each RTP packet typically increment in a predictable pattern. Several things may influence the predictable pattern including, but not limited to, the type of codec in use.

One of the drawbacks to RTP is that it allows flexibility in determining what is an acceptable RTP packet based on its timestamp and sequence number fields. Variations in the timestamp and sequence number fields are allowed in RTP which may lead to invalid packets being allowed in the packet network.

One issue that is not adequately addressed within the art concerns denial of service (DOS). One exemplary DOS attack utilizes a hostile machine creating forged (spoofed) messages that appear to originate from legitimate senders. The hostile machine sends the spoofed messages to a targeted destination. With a sufficiently large number of spoofed messages, the target's phone (or data) services become clogged and rendered inoperable. RTP streams are currently not validated or policed beyond simple checks.

A successful DOS attack may result in crashing a particular element. When dealing with a phone, the phone may no longer accept user input and no longer be unusable. Furthermore, the element may enter a reboot cycle as a result of the DOS attack and/or the element may require manual intervention to bring the element back online. Successful DOS attacks may also result in the inability of the element to process additional calls since the element is flooded with malicious messages and cannot process valid messages. Thus, the DOS attack makes service unavailable to legitimate users, who will typically experience a busy signal or "dead air." Finally, a successful DOS attack often results in degradation in the voice quality of the service. This degradation is due, in part, to a decrease in available band-width and processor resources. Voice quality can be measured by a Mean Opinion Score (MOS) and typical DOS attacks may result in a decreased MOS from acceptable to unacceptable, where 2.5 is considered the minimum acceptable MOS.

A solution is needed to reduce malicious DOS attacks in a packet network. The solution needs to detect the presence of malicious packets, and remove them or reduce their impact.

SUMMARY OF THE INVENTION

This disclosure describes, among other things a method and system for detecting and mitigating RTP-based denial of service attacks. The present invention implements a prediction model to analyze data within RTP packets to predict a range of valid data for future packets. Subsequent RTP packets that contain data that fall within the predicted range of data are considered valid RTP packets while others may be considered invalid packets subject to subsequent analysis.

In accordance with the present invention, a method for reducing malicious packets in a packet network is provided that includes sampling packets in a data stream. A prediction model is developed for allowable ranges of data in future packets from the sampled packets. Data are analyzed in subsequent packets against the prediction model to determine the validity of the subsequent packets against the allowable ranges of data. A determination is made whether to remove the subsequent packets from the data stream based on the analysis of the data.

In another aspect, a method for validating media stream packets in a communications system is provided that includes sampling one or more data fields from the media stream packets. A prediction model is derived for subsequent data values in one or more data fields in subsequent media stream packets. A baseline is established for subsequent data values based on the prediction model. It is determined whether each media stream packet is valid based on a deviation between the one or more data fields in the subsequent media stream packets and the baseline.

In yet another aspect, an apparatus for reducing malicious packets in a packet network is provided that includes a means for sampling packets in a data stream, a means for developing a prediction model for allowable ranges of data in future packets from the sampled packets, a means for analyzing data in subsequent packets against the prediction model to determine the validity of the subsequent packets against the allowable ranges of data, and a means determining whether to remove the subsequent packets from the data stream based on the analysis of the data.

In yet another aspect, a system for reducing malicious packets in a packet network is provided that includes at least one terminal endpoint device in communication with at least one initiating endpoint device, and at least one intermediary component coupled to the at least one terminal endpoint and operable to sample packets in a data stream, to develop a prediction model for allowable ranges of data in future packets from the sampled packets, to analyze data in subsequent packets against the prediction model to determine the validity of the subsequent packets against the allowable ranges of data, and to determine whether to remove the subsequent packets from the data stream based on the analysis of the data.

In yet another aspect, a system for validating media stream packets in a communications system is provided that includes at least one terminal endpoint device in communication with at least one initiating endpoint device, at least one intermediary component coupled to the at least one terminal endpoint and operable to sample one or more data fields from the media stream packets, to derive a predication model for subsequent data values in one or more data fields in subsequent media stream packets, to establish a baseline for subsequent data values based on the prediction model, and to determine whether each media stream packet is valid based on a deviation between the one or more data fields in the subsequent media stream packets and the baseline.

In yet another aspect, a method for determining an average error rate in a packet network is provided that includes sampling packets in a data stream. A prediction model is developed for allowable ranges of data in future packets from the sampled packets. Data is analyzed in subsequent packets against the prediction model to determine the validity of the subsequent packets against the allowable ranges of data. A gradient is calculated from the allowable ranges of data developed from the prediction model to determine an error rate. The prediction model is modified when a pattern of subsequent packets contain data that deviates from the allowable ranges of data. The gradient is re-calculated one or more times based on one or more allowable ranges of data developed from the one or more modified prediction models to determine one or more new error rates.

BRIEF DESCRIPTION OF THE SEVERAL VIEWS OF THE DRAWINGS

The present invention is described in detail below with reference to the attached drawing figures, which are incorporated herein by reference, and wherein:

FIG. 3 is a block diagram of an exemplary equation for a linear regression model used when practicing an embodiment of the present invention;

DETAILED DESCRIPTION OF THE INVENTION

Figure 1:
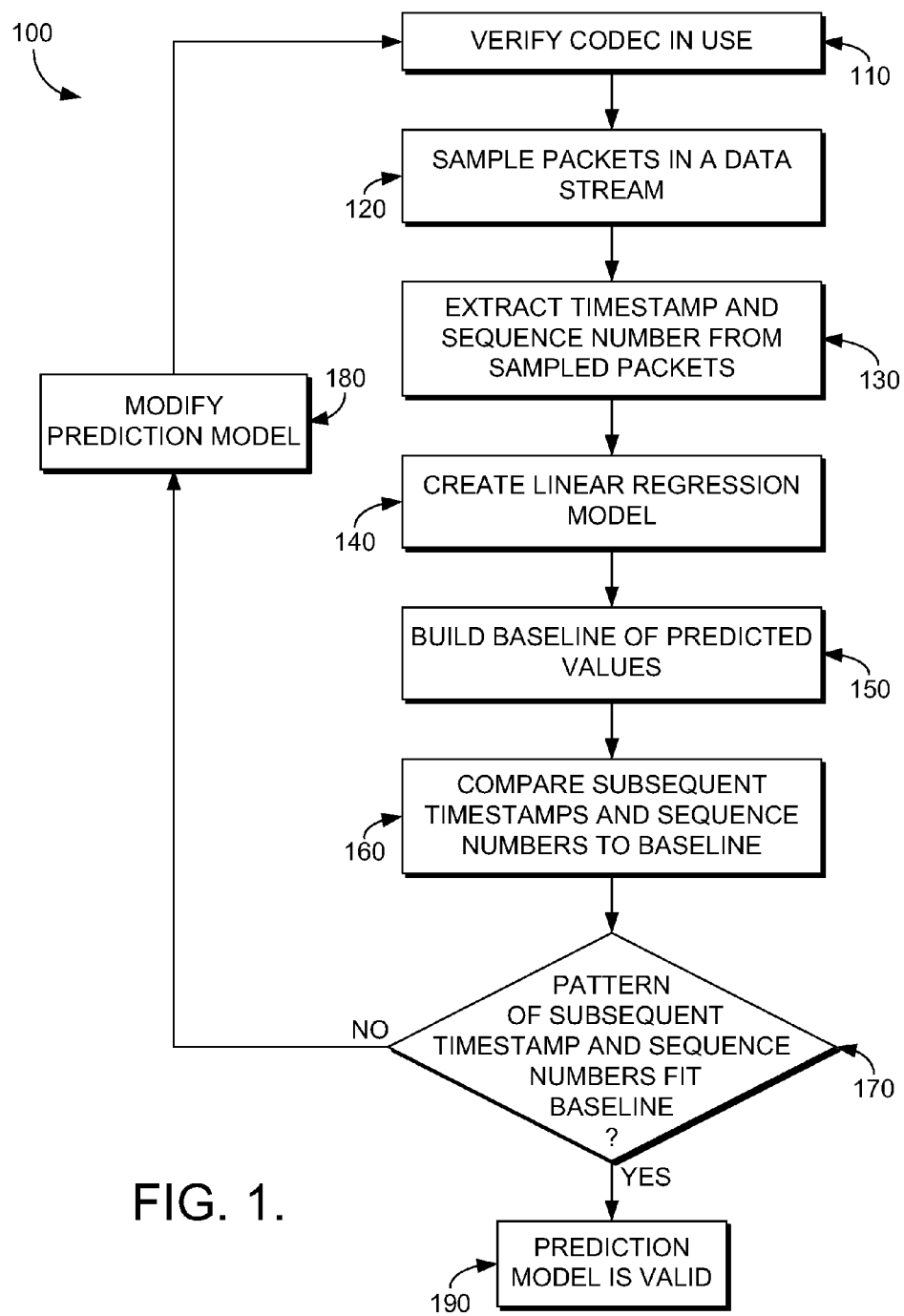
FIG. 1 is a flowchart illustrating an exemplary operating process for building and executing a prediction model in accordance with an embodiment of the present invention.

The present invention will be better understood from the detailed description provided below and from the accompanying drawings of various embodiments of the invention, which describe, for example, method and system for detecting and mitigating RTP-based denial of service attacks. The detailed description and drawings, however, should not be read to limit the invention to the specific embodiments. Rather, these specifics are provided for explanatory purposes that help the invention to be better understood.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

The present invention may be embodied as, among other things: a method, system, computer-program product, or combinations thereof. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and non-removable media, and contemplate media readable by a machine, database, or various other network devices.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

To help explain the invention without obscuring its functionality, a preferred embodiment will now be referenced in connection with a computing network. Although the present invention can be employed in connection with a computing-network environment, it should not be construed as limited to the exemplary applications provided here for illustrative purposes.

Detection and Mitigation of RTP-Based Denial of Service Attacks

An embodiment of the present invention implements a method to use information in data fields within past packets to predict information in future packets. Packets with information that deviate from the prediction would be considered malicious and potentially removed. Because an RTP stream progresses the timestamp and sequence number fields in a predictable pattern, it is possible to build a trending model for prediction to remove RTP-based denial of service attacks.

As stated earlier, RTP is a flexible protocol that allows many types of packets to exists. For example, a sudden increase in the sequence number of 200 may be considered acceptable as defined by THE INTERNET SOCIETY, RTP: A TRANSPORT PROTOCOL FOR REAL-TIME APPLICATIONS, (2003) [hereinafter RTP STANDARD] which is herein incorporated by reference. However, the present invention may limit the range of acceptable timestamp and sequence number values so that there may be distinction between those packets which are considered valid and those packets that may be considered malicious or invalid.

By sampling RTP packets in a stream and then using a prediction model such as a linear regression model containing a time series analysis, future values for timestamps and sequence numbers may be predicted. As with many models, network anomalies may be accounted for. This is illustrated below in the prediction model used for the present invention. Network anomalies may take the form of deviations or errors that occur in the network. For an embodiment of the present invention, the deviation or error may be user-configured or based on a derived value.

In FIG. 1, a method is shown for building and executing a prediction model 100. Prediction model 100 may be built in various ways implementing various embodiments of the present invention. In this embodiment in a step 110, a knowledge of the codec in use may provide behavioral information about the RTP packets in the packet network. When encountering certain codecs with an RTP stream, allowances may be taken into as to the impact the codecs may have on the RTP stream, and more particular, on the RTP packet. For example, interleaved video may result in a choppy pattern of timestamp values. Therefore, the creation of a prediction model may have to account for this type of behavior. Otherwise, the prediction model may provide incorrect results. Each RTP stream identifies its codec in use. Therefore, a codec may be identified and accounted for in building the prediction model.

In a step 120, a sample of RTP packets may be evaluated from the RTP stream. Not every RTP packet has to be evaluated in order to provide information to build prediction model 100. From the sampled RTP packets, timestamp and sequence number values may be extracted as identified in a step 130. In an RTP packet, the position of these values are fixed and may be obtained from their designated position within the RTP packet.

With information obtained for the codec, timestamp values, and sequence number values, a linear regression model using a time series analysis may be built in a step 140. An embodiment of the present invention may use a linear regression model to forecast a range of future timestamp and sequence number values. From past RTP packets and knowledge about behavioral information for the RTP packets, future data values may be predicted for future RTP packets in a linear fashion. The future data values may give rise to a range of values to create a baseline of predicted values as identified in a step 150.

With the baseline established, subsequent RTP packets may be sampled and their data may be compared to the baseline in a step 160. The baseline should be an indicator of the expected values for timestamps and sequence numbers. Their may be a baseline for timestamps and a separate baseline for sequence numbers. Although timestamp values and sequence number values are the two most common data identified to be gathered from an RTP packet, other data may be used to implement an embodiment of the present invention.

In a step 170, an indication is desired as to whether the baseline(s) from prediction model 100 includes data found in subsequent RTP packets that are sampled. If a series of newly sampled RTP packets contain data that does not fit the baseline(s) then the model may be discarded and a new prediction model may be created as identified in a step 180. If the data fits the baseline(s) then prediction model 100 may be presumed to be valid in a step 190. Thus, subsequent RTP packets may continue to be evaluated against the baselines until a new prediction is created from new samples of RTP packets. Now, the issue becomes how to use the prediction model to reduce malicious packets in a packet network.

Figure 2:
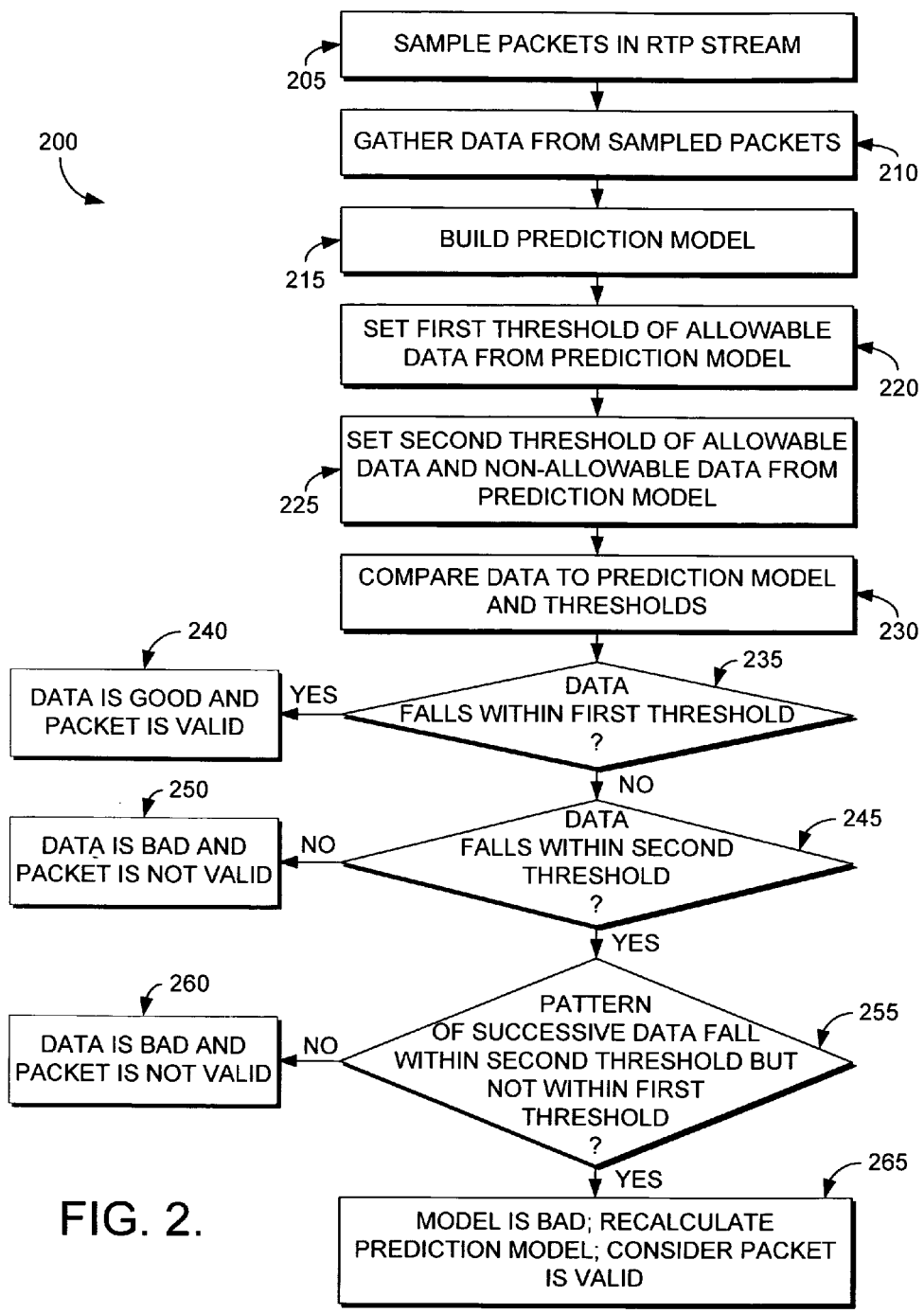
FIG. 2 is a flowchart illustrating an exemplary operating process for reducing malicious packets in accordance with an embodiment of the present invention.

In FIG. 2, a method is shown for reducing malicious packets related to DOS in 200. In a step 205, packets are sampled in a RTP stream on a configurable basis. Configurable basis means that the sampling rate may be adjusted as desired. The sampling rate may be adjusted by one implementing an embodiment of the present invention. Data is gathered from the sampled packets in a step 210. With the data and other information discussed above, a prediction model may be built in a step 215 also earlier discussed in FIG. 1. As was shown earlier, a baseline of values may be created from the prediction model. However, the present invention may restrict the baseline to a limited range of values. This may occur when a range values may be desired to correlate to a specific set of data, such as perfect or normal data, and another range values may be desired to correlate to another specific set of data, such as not-so-perfect, transitional, or borderline data. An embodiment of the present invention accounts for both ranges. However, other embodiments of the present invention may eliminate the restrictions to the baseline altogether.

In a step 220, a first threshold is established consistent with the approach to restrict the baseline to perfect or normal data. A second threshold is also established that is larger than the first threshold to cover data that may fall within the not-so-perfect, transitional, or borderline areas as shown in a step 225. The second threshold may be limited to both allowable and non-allowable data while the first threshold may be limited to allowable data only. Flexibility in building the present invention may allow an implementer to adjust the thresholds as desired, or as mentioned earlier, discard the thresholds altogether. For the case of interleaved video, the prediction model may require a higher sampling set of packets and an increase in the threshold values.

In a step 230, new packets may be sampled and their data may be compared to the prediction mode and the thresholds. Data from the packet that contains a value that falls within the first threshold, a step 235, may be considered valid and the packet judged to be good as indicated in a step 240. Data from the packet that contains a value that falls outside of the first threshold may be evaluated again in a step 245 to determine if the value falls within the second threshold. If the value of the data falls outside of the second threshold, the data may be considered to be bad and the packet may be judged invalid in a step 250. The result may be for the packet to be removed from the packet network under a presumption that the packet may be malicious with regards to DOS. However, if the value of the data falls within the second threshold, the data may be evaluated again in a step 255 to determine if the data is part of a pattern of behavior.

Step 255 may provide a decision point in the present invention to determine what to do with a set of packets that do not meet the requirements of the first threshold but may meet the requirements of the second threshold. If a successive number of packets exhibit a similar pattern of behavior to fall within the second threshold but not the first threshold then the prediction model may be considered to be bad in a step 265. Thus, the prediction model may be modified (or recreated) and the packets may be considered to be good although their data did not meet the first threshold. The idea here is to correct a prediction model that may be potentially wrong while the packets may be valid. Alternatively, if a pattern of packets fall within the second threshold with some of the packets falling into the first threshold, the data may be considered bad and the packets may be considered invalid as shown in a step 260.

A scenario of the discussion above may be illustrated as follows. Given that certain deviations from the predicted trendline may be acceptable, one set of thresholds may be established for packets within the 'normal' zone. Another set of thresholds may be set higher or wider to allow for a greater deviation from the trendline beyond what would be considered 'normal'. The additional zone may be known as the 'transition' zone and may allow for things such as re-convergence after network events and jitter buffers. Sampled packets that may fall into the 'transition' zone may be allowed to pass as good packets under certain constraints. If a large number of consecutive samples appear in the 'transition' zone then this may trigger the creation of a new prediction model and/or the packets may be removed from the packet network. Further analysis would be needed to decide the fate of the packets. If a pattern of packets fall within the 'transition' zone without falling into the 'normal' zone then the trendline from the prediction model would be recalculated. Some event in the packet network may have occurred resulting in a shift in the current trendline. Consequently, packets that fall outside of the 'transition' zone may be removed without further analysis as they may be considered beyond the bounds of acceptability.

In the case of the interleaved video, not only would a higher sampling set be established to account for the affects of the codec, but thresholds for both the 'normal' and 'transition' zones may be increased. These modifications may allow valid RTP streams using an interleaved video codec to pass through an embodiment of the present invention while still providing protection against non-valid RTP packets. Interleaved video codecs are one example used to illustrate how the workings of the present invention may be implemented. However, the present invention may be implemented to automatically adjust for various codecs.

Now turning to FIG. 3, a block diagram is shown of a linear regression equation in model 300. Model 300 may be used to build the prediction model discussed in the present invention. Although linear regression is used to build the prediction model in FIG. 3, other concepts may be used to implement embodiments of the present invention. Linear regression attempts to model a relationship between two variables by fitting a linear equation to observed data. In order to use linear regression as part of model 300, one has to know that there exists a relationship between the variables of interest. If there exists a relationship between the variables then linear regression may prove to be a useful model. However, if there is not a relationship between the variable of interest then the linear regression model may need to be changed. In order to determine this relationship between the variables, a correlation coefficient, known as $r^2$, may be calculated. The correlation coefficient determines a measure of association between two variables and how strong that association may be.

Model 300 includes a Y-hat 310, an alpha 320, a beta 330, an X 340, and an epsilon 350. Y-hat 310 is a dependent variable of what is being predicted or explained. Alpha 320 is a constant which provides a value for Y-hat 310 when X 340 is zero. X 340 is the value of the variable (x) which predicts or explains the value of Y-hat 310. Beta 330 is the coefficient of X 340. Beta 330 provides the slopes of the regression line and determines how much Y-hat 310 changes for each unit of change to X 340.

Even though we create model 300 to provide a baseline of predicted data, the present invention also incorporates an embodiment to determine if model 300 is valid for Y-hat 310 and X 340. An embodiment of the present invention uses the correlation coefficient, $r^2$, to determine if the relationship between Y-hat 310 and X 340 is significant. A correlation coefficient closer to the value of one (1) would indicate a strong correlation between the two variables. For example, if the correlation coefficient is limited to a value of 0.9 or higher, the prediction model would limit the baseline (range of data values) to reduce the interference of malicious or spurious data to the baseline. As one ordinary skilled in the art may understand, a correlation coefficient closer to a value of one indicates a strong correlation or relationship while a correlation coefficient closer to a value of zero indicates no association between the variables.

In FIG. 3, the creation of model 300 may take into account the impact of errors or anomalies that may occur in a packet network. The results of model 300 may account for deviations from the predicted values by incorporating epsilon 350 as a component of the prediction model. An embodiment of the present invention accounts for epsilon 350 by making it user-configurable or based on some derived value. However, other implementations of the present invention may not incorporate epsilon 350.

Figure 4:
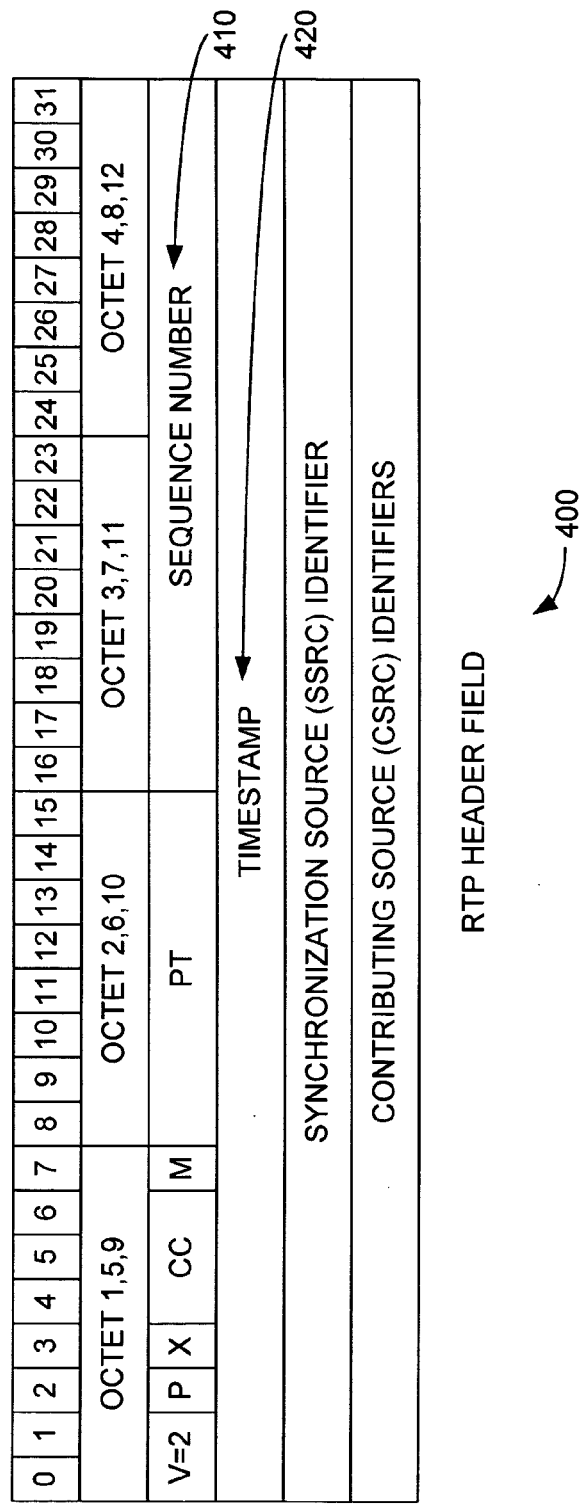
FIG. 4 is a block diagram of an exemplary RTP header packet in accordance with an embodiment of the present invention.

In FIG. 4, a block diagram of a RTP header field 400 is shown illustrating information contained within the header field of a RTP packet. RTP header field 400 contains information regarding delay and packet loss. Each RTP packet has a unique sequence number when it is created as shown by a sequence number 410. RTP packets are sequentially numbered when they are sent. Therefore, upon arrival of the RTP packets at the receiving end of a device, one may detect the RTP packet with a particular sequence number 410 and know its position relative to other RTP packets. Sequence number 410 may also be used to restore a packet's sequence. Hence, FIG. 4 illustrates the information that may be obtained within an RTP packet.

Each RTP packet has a timestamp 420 identifying a time when the RTP packet was created. Timestamp 420 is related to a sampling instant of a first octet in an RTP data packet. Timestamp 420 provides a mechanism to maintain synchronization but may also be used to determine jitter and delay. As shown by FIG. 4, sequence number 410 and timestamp 420 are obtainable values that may be used in the present invention to create model 300. They also provide the values that are used in FIGS. 1 and 2.

Figure 5:
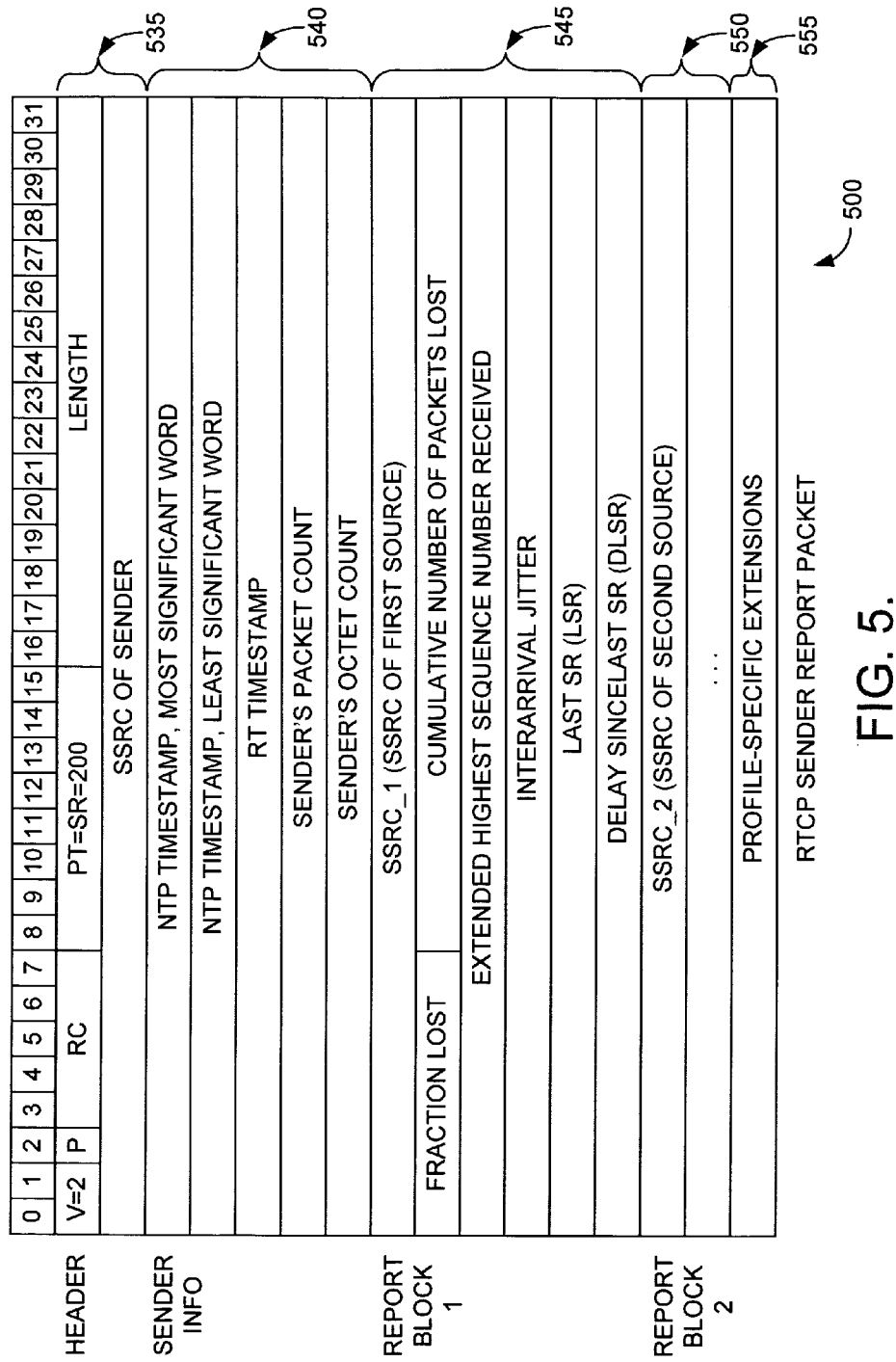
FIG. 5 is a block diagram of an exemplary RTCP sender report packet in accordance with an embodiment of the present invention.
Figure 6:
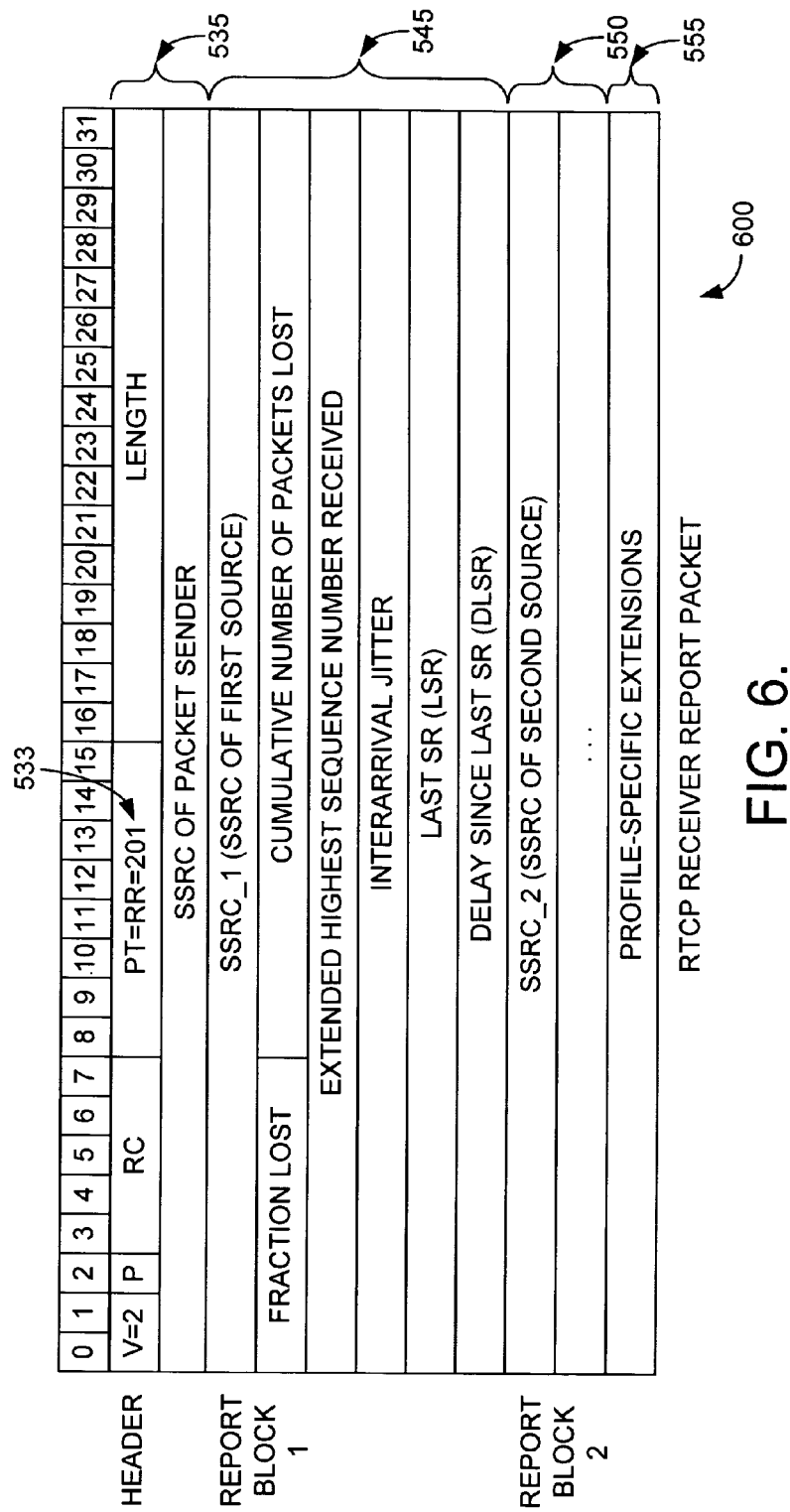
FIG. 6 is a block diagram of an exemplary RTCP receiver report packet in accordance with an embodiment of the present invention.

RTP senders and receivers are devices in the network that provide reception quality feedback using RTCP report packets as found in FIGS. 5 and 6. RTCP is an associated protocol within RTP that provides information about a particular RTP stream including packet loss, jitter, and timing information. An RTP sender may function simultaneously as an RTP receiver.

In FIG. 5, an RTCP Sender Report Packet (SRP) 500 is illustrated with packet information. SRP 500 may consist of three or more sections identified by a header 535, a sender info 540, a first report block 545, a second report block 550, and a profile 555. Header 535 contains the first section in SRP 500 and may be eight (8) octets long. Sender info 540 contains the second section in SRP 500 and may be twenty (20) octets long. Sender info 540 summarizes data transmissions from an RTP sender. First report block 545 and second report block 550 form the third section in SRP 500. First report block 545 and second report block 550 convey statistics on the reception of RTP packets from a single synchronization source. The third section of SRP 500 may vary in the number of report blocks, and in some cases, may not contain any report blocks. Finally, profile 555 may appear in SRP 500 in a fourth section when additional information needs to be reported about an RTP sender or receiver. Otherwise, it may not be included in the packet.

In FIG. 6, an RTCP Receiver Report Packet (RRP) 600 is illustrated with packet information. RRP 600 is similar to SRP 500 except that a packet type code 533 contains a constant value and sender info 540 does not exists. Otherwise, RRP 600 may consist of header 535, zero or more report blocks as identified by first report block 545 and second report block 550, and profile 555.

In FIGS. 5 and 6, SRP 500 and RRP 600 are briefly discussed. With regards to implementing an embodiment of the present invention, SRP 500 and RRP 600 may be used to provide data values related to timestamps and sequence numbers. More details may be obtained on SRP 500 and RRP 600 by referring to RTP STANDARD, supra.

From the above-mentioned discussions, an embodiment of the present invention may use the gradient of the baselines calculated from the prediction model to determine an average error rate corresponding to packet loss. Changes in the gradient may indicate network behavior such as congestion or the happening of other events in the network. For example, if the gradient has a value of 1.01 (assuming every RTP packet is sampled) then the error rate is one percent (1%). This information may provide an ability to provide additional monitoring capabilities to a packet network such as monitoring network stability by tracking how often a baseline changes.

From the foregoing it will be appreciated that, although specific embodiments of the present invention have been described herein for purposes of illustration, various modifications may be made without deviating from the spirit and scope of the invention. Accordingly, the invention is not limited except as by the appended claims.

The invention claimed is:

1. A method for reducing malicious packets in a packet network, comprising:
    identifying one or more codecs in use in the packet network;
    sampling packets in a real-time transport protocol (RTP) data stream;
    developing a linear regression model, using time series analysis, that includes information about the one or more codecs and indicates allowable ranges of data in future packets from the sampled packets;
    incorporating an allowed deviation into the linear regression model to establish a baseline of acceptable data values;
    extracting at least timestamp values and sequence number values from subsequent packets;
    analyzing the at least timestamp values and sequence number values against the linear regression model to determine a validity of the subsequent packets against the allowable ranges of data;
    determining whether to remove the subsequent packets from the data stream based on the analysis of the data; and
    removing the subsequent packets that are outside the allowable ranges of data.

2. The method of claim 1, wherein developing the linear regression model comprises including a configurable correlation coefficient threshold.

3. The method of claim 2, wherein incorporating the allowed deviation comprises incorporating at least one of a user-configurable error tolerance and a derived value.

4. The method of claim 1 further comprising identifying a codec associated with the data stream to provide behavioral information to develop the linear regression model.

5. The method of claim 1, wherein determining whether to remove the subsequent packets comprises removing packets that contain data that deviates from the linear regression model.

6. The method of claim 1, further comprising modifying the linear regression model when a pattern of subsequent packets contain data that deviates from the allowable ranges of data.

7. The method of claim 6, wherein determining whether to remove the subsequent packets comprises removing packets that contain data that deviates from the modified linear regression model.

8. The method of claim 1, wherein data comprises at least one of a timestamp value and a sequence number.

9. The method of claim 8, wherein the allowable ranges of data comprise valid ranges for time stamp values.

10. The method of claim 8, wherein the allowable ranges of data comprise valid ranges for sequence numbers.

11. A computer system having a processor, a memory and an operating environment, the computer system operable to execute the method as recited in claim 1.

12. A non-transitory computer-readable storage medium having instructions stored thereon for performing the method of claim 1.

13. A method for validating real-time transport protocol (RTP) media stream packets in a communications system, comprising:
    identifying one or more codecs in use in the communications systems;
    sampling one or more data fields from the RTP media stream packets;
    deriving a linear regression model, using time series analysis, that includes information about the one or more codecs, for subsequent data values in one or more data fields in subsequent media stream packets;
    establishing a baseline for subsequent data values based on the linear regression model;
    determining whether each media stream packet is valid based on a deviation between the one or more data fields in the subsequent media stream packets and the baseline; and
    removing each media stream packet that deviates an amount from the baseline.

14. The method of claim 13, wherein sampling one or more data fields comprises sampling from the set including timestamp values and sequence numbers.

15. The method of claim 14, wherein determining whether each media stream packet is valid comprises removing media stream packets that contain data values that deviate from the baseline of the linear regression model.

16. The method of claim 14, further comprising modifying the linear regression model when a pattern of media stream packets contain data that deviate from the baseline.

17. The method of claim 16, wherein determining whether each media stream packet is valid comprises removing media stream packets that contain data values that deviate from a modified baseline of a modified linear regression model.

18. A computer system having a processor, a memory and an operating environment, the computer system operable to execute the method as recited in claim 13.

19. A non-transitory computer-readable storage medium having instructions stored thereon for performing the method of claim 13.

20. An apparatus for reducing malicious packets in a packet network, comprising:
    means for identifying one or more codecs in use in the packet network;
    means for sampling packets in a real-time transport protocol (RTP) data stream;
    means for developing a linear regression model, using time series analysis, that includes information about the one or more codecs and indicates allowable ranges of data in future packets from the sampled packets;
    means for incorporating an allowed deviation into the linear regression model to establish a baseline of acceptable data values;
    means for extracting at least timestamp values and sequence number values from subsequent packets;
    means for analyzing the at least timestamp values and sequence number values against the linear regression model to determine a validity of the subsequent packets against the allowable ranges of data;

means for determining whether to remove the subsequent packets from the data stream based on the analysis of the data; and means for removing the subsequent packets that are outside the allowable ranges of data.

21. A system for reducing malicious packets in a packet network, comprising:

at least one terminal endpoint device in communication with at least one initiating endpoint device; and at least one intermediary component coupled to the at least one terminal endpoint device and operable to sample packets in a real-time transport protocol (RTP) data stream, to develop a linear regression model, using time series analysis, that includes information about one or more codecs and indicates allowable ranges of data in future packets from the sampled packets, to incorporate an allowed deviation in the linear regression model to establish a baseline of acceptable data values, to extract at least timestamp values and sequence number values from subsequent packets, to analyze the at least timestamp values and sequence number values against the prediction model to determine a validity of the subsequent packets against the allowable ranges of data, to determine whether to remove the subsequent packets from the data stream based on the analysis of the data, and to remove the subsequent packets that are outside the allowable ranges of data.

22. The system of claim 21, wherein the at least one intermediary component is integrated into at least one telecommunications device coupled to the at least one terminal endpoint component.

23. The system of claim 21, wherein the at least one intermediary component is integrated into at least one dedicated denial-of-service device in communications with the at least one terminal endpoint device.

24. A system for validating real-time transport protocol (RTP) media stream packets in a communications system, comprising:

at least one terminal endpoint device in communication with at least one initiating endpoint device; and at least one intermediary component coupled to the at least one terminal endpoint device and operable to sample one or more data fields from the RTP media stream packets, to derive a linear regression model, using time series analysis, for subsequent data values in one or more data fields in subsequent media stream packets wherein the linear regression model includes information about one or more codecs, to incorporate an allowed deviation in the linear regression model to establish a baseline of acceptable data values, to establish a baseline for subsequent data values based on the linear regression model, to determine whether each media stream packet is valid based on a deviation between the one or more data fields in the subsequent media stream packets and the baseline, and to remove each media stream packet that deviates an amount from the baseline.

25. The system of claim 21, wherein the at least one intermediary component is integrated into at least one telecommunications device coupled to the at least one terminal endpoint component.

26. The system of claim 21, wherein the at least one intermediary component is integrated into at least one dedicated denial-of-service device in communications with the at least one terminal endpoint device.

27. A method for determining an average error rate in a packet network, comprising:

identifying one or more codecs in use in the packet network;

sampling packets in a real-time transport protocol (RTP) data stream;

developing a linear regression model that includes information about the one or more codecs and indicates allowable ranges of data in future packets from the sampled packets;

incorporating an allowed deviation into the linear regression model to establish a baseline of acceptable data values;

extracting at least timestamp values and sequence number values from subsequent packets;

analyzing the at least timestamp values and sequence number values against the linear regression model to determine a validity of the subsequent packets against the allowable ranges of data;

calculating a gradient from the allowable ranges of data developed from the linear regression model to determine an error rate;

modifying the linear regression model when a pattern of subsequent packets contain data that deviates from the allowable ranges of data; and re-calculating the gradient one or more times based on one or more allowable ranges of data developed from one or more modified linear regression models to determine one or more new error rates.

28. The method of claim 27, wherein determining the error rate comprises determining an average packet loss.

29. The method of claim 28, wherein determining one or more new error rates comprises determining the rate of change to one or more baselines the rate of change to one or more baselines corresponding to network stability.

* * * * *